United States Patent [19]

Irwin et al.

[11] 3,829,626

[45] Aug. 13, 1974

[54] TELEPHONE LINE EQUALIZER

[75] Inventors: Robert P. Irwin, Huntington; Alexander Kwartiroff, Sea Cliff, both of N.Y.

[73] Assignee: Datadyne Corp., Huntington, N.Y.

[22] Filed: Aug. 14, 1972

[21] Appl. No.: 280,738

[52] U.S. Cl............. 179/170 R, 330/28 R, 330/109

[51] Int. Cl............................................. H04b 3/36

[58] Field of Search...... 179/170 R, 170 T, 170 NC; 330/107, 109, 192, 198, 20; 333/28 R

[56] References Cited

UNITED STATES PATENTS

| | | | |
|---|---|---|---|
| 3,383,616 | 5/1968 | Friend | 330/109 |
| 3,483,335 | 12/1969 | Piotrowski | 179/170 R |
| 3,671,886 | 6/1972 | Fudemoto | 333/18 |
| 3,728,649 | 4/1973 | Waldhauer | 333/18 |

OTHER PUBLICATIONS

"Line Equalizer Uses Active RC Network" by A. R. Campbell, Electronic Design 3; Feb. 1, 1969; pp. 74, 76.

*Primary Examiner*—Kathleen H. Claffy
*Assistant Examiner*—Alan Faber
*Attorney, Agent, or Firm*—Hane, Baxley & Spiecens

[57] ABSTRACT

A telephone line equalizer for compensating for the attenuation characteristics of telephone lines of varying attenuations includes an operational amplifier connected in series with a telephone line. Controlling the voltage feedback path of the amplifier is a filter network having an electrical frequency characteristic substantially the same as the telephone line.

9 Claims, 1 Drawing Figure

PATENTED AUG 13 1974 3,829,626
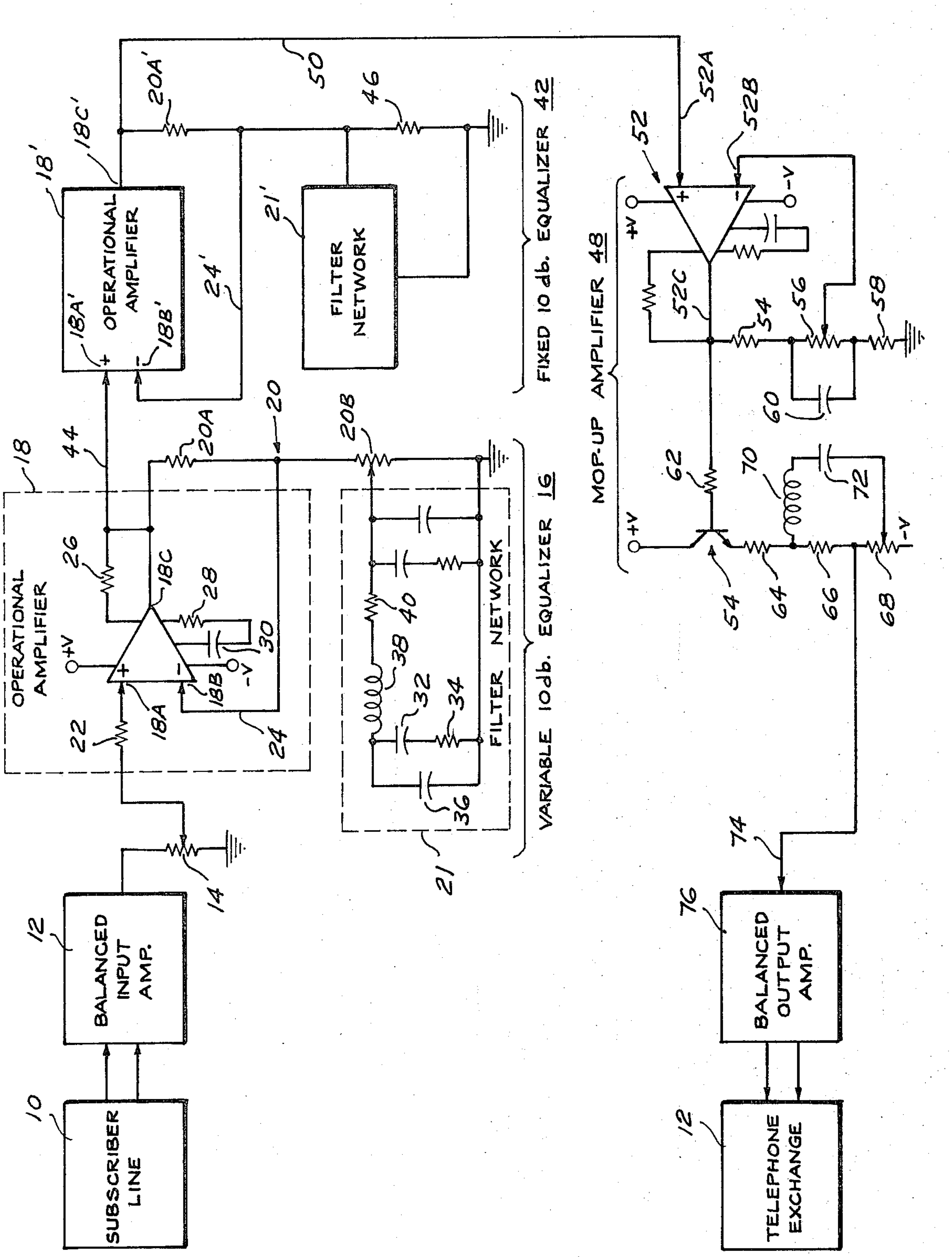

TELEPHONE LINE EQUALIZER

This invention pertains to telephone line equalizers and more particularly to active line equalizers for compensating for the non-linear attenuation of telephone signals transmitted by a telephone line.

In the transmission of communication signals by telephone lines, the signals are distorted because of the high attenuation introduced by the lines. This attenuation, because of the physical parameters of the line, increases with increasing signal frequencies, i.e., the attenuation is frequency dependent. Now, it should be realized that most communication signals, such as speech signals or data pulses, comprise a broad range of component frequencies. Therefore, such signals are easily distorted.

In order to linearize the attenuation common practice with telephone systems is to load the lines periodically with loading coils. Such coils increase the cost of the lines. However, one is willing to pay the price since it improves the response of the line to voice signals. Nevertheless, such loading coils by their very nature severely attenuate the higher frequency signals and introduce phase delays which greatly affect the transmission of data pulses. Furthermore, such lines either loaded or unloaded presently use passive line equalizers. Such equalizers are relatively large and complex. And because of the number of variable elements and their interactions they require considerable adjustment ("tuning") by skilled technicians to provide good equalization of the line in question. Since each line has a different length, the equalizer for each line must be individually tuned. When one realizes that each subscriber line between an exchange and a subscriber subset can require an equalizer, it should be apparent that there is an economic need for improved equalizers.

It is, accordingly, a general object of the invention to provide an improved telephone line equalizer of the active type.

It is another object of the invention to provide a telephone line equalizer which has a greater universality of use than presently available line equalizers.

It is a further object of the invention to more simply linearize the response of telephone lines over much broader frequency bands than presently attainable.

It is yet another object of the invention to provide telephone line equalization which is simpler and less expensive by eliminating the costs of load cables by eliminating the costs of stocking large numbers of different types of equalizers and by minimizing installation time.

Further objects and advantages of the invention will be apparent from the following detailed description of a presently preferred embodiment of the invention when read with the accompanying drawing whose sole FIGURE shows by way of example and not limitation circuitry for implementing the invention.

In the drawing, a subscriber line 10 which can include a length of cable is connected by an equalization system to a telephone exchange 12. The equalization system in effect has the inverse transfer characteristic of the subscriber line over the band of frequencies under consideration, say 200 to 4,000 $H_z$, so that the telephone exchange input receives substantially undistorted signals within that frequency band.

The equalization system includes a balanced input amplifier 12 which has an input impedance that matches the characteristic impedance of the cable of subscriber line 10. Balanced input amplifier 12 is well known and functions to convert the balanced signal at its input to a unbalanced signal at its output and also provides signal gain. The output of balanced input amplifier 12 is connected, via potentiometer 14 (to provide gain adjestment), to the input of variable 10 db. equalizer 16. Variable equalizer 16 which will correct for cable lengths in the range of 0 to 10 db. comprises operational amplifier 18, and a voltage feedback means including filter network 21 and resistive means 20 in the form of fixed resistor 20A and potentiometer 20B.

Operational amplifier 18 which can be a Motorola type MC 1439 has a signal input 18A connected via resistor 22 to the slider or tap of potentiometer 14, a feedback input 18B connected via line 24 to the junction of resistor 20A and potentiometer 20B, and a signal output 18C connected via resistive means 20 to ground (a source of reference potential). Note, resistors 26 and 28 and capacitor 30 are required for internal connections of the amplifier and are determined by the specification sheets of the manufacture. In this particular configuration, the amplifier is a differential amplifier wherein there is transmitted from signal output 18C the difference of the signals received at inputs 18A and 18B. Furthermore, since the signal at input 18B is derived from the signal and output 18C, the amplifier 18 is a negative voltage feedback amplifier with a feedback network comprising resistive means 20 and filter network 21.

Filter network 21 is designed to show substantially the same electrical frequency characteristic as the telephone line or cable and when included in the feedback circuits as shown corrects the frequency roll off due to the telephone line and makes the overall response flat. The filter network 21 is a pi-section having two legs. A typical leg includes a series circuit of capacitor 32 in series with resistor 34, and capacitor 36 in parallel with the series circuit. One end of each of the legs is connected to a corresponding end of the other leg by inductor 38 and resistor 40. The other end of the legs is grounded. The filter network is connected in parallel with a portion of resistive means 20 by the connection to the wiper of potentiometer 20B.

If the slider of potentiometer 20B is in the lowermost position as viewed in the FIGURE, the frequency response of the amplifier is unaffected by filter network 21 and in a sense the equalizer is correcting for 0 db. of cable length. If the slider is in the uppermost position then full correction for 10 db. of cable length is obtained. For intermediate positions correction is obtained for cable lengths between 0 and 10 db.

If the cable length is greater than 10 db. it is necessary to add further equalization. In such a case, it is desirable to cascade the variable equalizer 16 with a fixed equalizer. Assuming, the cable length is between 10 and 20 db. a fixed 10 db. equalizer 42 is cascaded to variable 10 db. equalizer 16 by connecting the input of the former via line 44 to output 18C of operational amplifier 18. For even longer cables additional fixed 10 db. equals zero can be cascaded.

Fixed 10 db. equalizer 42 is identical with variable 10 db. equalizer 16 with one difference. Therefore, primed reference numerals will be used for like elements and only the difference will be discussed. In particular, potentiometer 20B is replaced by a fixed resistor 46 of the same value and filter network 21′ connected in parralel therewith.

Since the fixed and variable equalizers 16 and 42 may not equalize the line or cable roll-off to a desired accuracy, an additional correction may be required. This correction is performed by a mop up or spot frequency amplifier which can correct the low end, the high end of the frequency band or any desired spot frequency within the band. Mop up amplifier 48 connected via line 50 to the output of equalizer 42 can correct the low frequency end and one spot frequency which can be the highest frequency of the band.

Mop up amplifier 48 comprises the circuit centered around operational amplifier 52 which corrects the low end of the band in cascade with the circuit centered around transistor 54 which corrects the upper spot frequency.

Operational amplifier 52 is similar to operational amplifier 26 but includes a different feedback network. The signal input 52A is connected to the output 18C by line 50. The signal output 52C is connected via the series circuit of resistor 54, potentiometer 56 and resistor 58 to ground. Connected in parallel with potentiometer 56 is capacitor 60. The slider of potentiometer 56 is connected to the feedback input 52B of amplifier 52.

If the slider of potentiometer 56 is in the upper position as shown in the FIGURE, all frequencies whose period is less than the time constant of potentiometer 56 and capacitor 60 will be depressed and consequently the higher frequencies at the output 52C will be boosted. In a similar manner, when the slider of potentiometer 56 is in the lower position the lower frequencies will be boosted. In the center position the circuit is frequency balanced and the response at output 52C is flat. Accordingly, the potentiometer 56 can boost or depress all frequencies below a certain frequency determined by the time constant of potentiometer 56 and capacitor 60.

Any spot frequency can be corrected by the emitter-follower amplifier utilizing transistor 54 whose collector is connected to voltage source +V and whose base is connected by resistor 62 to the output 52C of operational amplifier 52. The emitter of transistor 54 is connected via the serial circuit of fixed resistor 64, fixed resistor 66 and potentiometer 68 to voltage source −V. Inductor 70 and capacitor 72 provide a series resonant circuit at the spot frequency which is connected in parallel with a portion of the resistive network by means of connections to the junction of the fixed resistors 64 and 66 and to the slider of potentiometer 68. The spot frequency $f$ is determined by the usual relation:

$f = 1/2\pi\sqrt{LC}$ and the bandwidth $Q = 2\pi fL/r$ where $r$ represents the loss in the series resonant circuit.

Potentiometer 68 acting as a voltage divider in conjunction with resistors 64 and 66 controls the amplitude of the selected frequency signal. By virtue of the fact that resistor 64 establishes a fixed transmission loss in the system, adjustment of potentiometer 68 permits both positive and negative equalization control.

If several spot correction frequencies are desired a plurality of similar networks can be added in parallel in in the emitter circuit of transistor 54.

The output of mop up amplifier 48, i.e., the junction of resistor 66 and potentiometer 68 is connected via line 74 to balanced output amplifier 76 (known per se) which converts the unbalanced signal to a balanced signal which is fed over a line pair to telephone exchange 12.

There has thus been shown an improved active line equalizer system. Although the equalizer system has been shown in the line from the subscriber to the exchange, it can equally be used in the line from the exchange to the subscriber. Practicality dictates that the equalizer system be located at the exchange end of the line although it can be placed at either end of a line. When the equalizer system is at the exchange end of the line from the subscriber to the exchange, as shown and described, the signals from the subscriber can have their usual level. If the equalizer system is at the exchange end of the line from the exchange to the subscriber some of the signals from the equalizer system onto the line must be at a higher than normal level. If this is undesirable, the equalizer system can be set at a low level of transmission and a flat response amplifier added to the subscriber end of the line.

While a complete equalizer system has been shown which includes a variable equalizer, a fixed equalizer and a mop up amplifier, it should be realized that depending on the types of lines and desired amounts of correction required some elements can be deleted. In any event, as a practical matter, the minimum equalizer would comprise variable 10 db. equalizer 16. For example, if the line length were less than 10 db. there is no need for fixed 10 db. equalizer 42. If fine connections are not needed then there may be no need for mop up amplifier 48. Even if fine corrections are needed, then, the choice of which frequencies are to be corrected determines whether one should use a spot frequency mop up or a roll-off mop up or both.

It should be noted that, although, the frequency band given by way of example is from 200 to 4,000 $H_z$, the frequency bandwidth that can be equalized is only limited by noise and and some cable characteristics. Therefore, the equalizers of the invention can be used for bandwidths in the $MH_z$ range. Similarly, while the example cites equalization up to twenty db. such equalization is only limited by noise and cable characteristics and can go to the 100 db. range depending on cable bandwidth and noise.

Although only one embodiment of the invention has been shown and described in detail there will now be obvious to those skilled in the art many modifications and variations satisfying many or all of the objects of the invention but which do not depart from the spirit thereof as defined in the appended claims.

What is claimed is:

1. A telephone line equalizer circuit for compensating for the attenuation characteristics of telephone lines of varying attenuations comprising: input and output terminals for connecting said circuit in a telephone line; an operational amplifier means having a signal input, a feedback input and a signal output; first connecting means for connecting said signal input to said input terminal; second connecting means for connecting said signal output to output terminal; a voltage feedback means connecting said signal output to said feedback input, said voltage feedback means comprising a filter network having an electrical frequency characteristic substantially the same as the telephone line, a reference potential means, a resistive means connected between said signal output and said reference potential means, means for connecting said feedback input to said resistive means in such a way that the voltage developed across at least a fractional part of said resistive means is fed to said feedback input as a feedback signal, and controllable connection means for connecting said filter network in parallel with a selectable portion of said resistive means.

2. The telephone line equalizer circuit of claim 1 wherein said voltage feedback means comprises a reference potential means, a resistor and a potentiometer connected in series between said signal output and said reference potential means, means for connecting said feedback input to the junction of said potentiometer and said resistor and means for connecting said filter network between the wiper of said potentiometer and said reference potential means.

3. The telephone line equalizer circuit of claim 1 wherein one of said connecting means comprises a spot frequency amplifier means for modifying particular frequency signals.

4. The telephone line equalizer circuit of claim 3 wherein said spot frequency amplifier means comprises a further operational amplifier means having a signal input, a feedback input and a signal output, a reference potential means, a potentiometer means connected between the signal output of said further operational amplifier means and said reference potential means, a capacitor connected in parallel with at least a portion of said potentiometer means, and means for connecting the slider of said potentiometer means to the feedback input of said further operational amplifier means.

5. The telephone line equalizer circuit of claim 3 wherein said spot frequency amplifier means comprises an emitter-follower amplifier means including potentiometer means in the emitter circuit thereof, and a series circuit including an inductor and a capacitor connected to said potentiometer means and the slider thereof in such a way that said series circuit is in parallel with selectable portions of said potentiometer means.

6. A telephone line equalizer circuit for compensating for the attentuation characteristics of telephone lines of varying attenuations comprising: input and output terminals for connecting said circuit in a telephone line; an operational amplifier means having a signal input, a feedback input and a signal output; first connecting means for connecting said signal input to said input terminal; second connecting means for connecting said signal output to output terminal; and a voltage feedback means connecting said signal output to said feedback input, said voltage feedback means comprising, a reference potential means, a filter network having an electrical frequency characteristic substantially the same as the telephone line, said filter network comprising a pi-section including first and second legs each having a resistor and capacitor in series and a further capacitor in parallel therewith, an inductor and further resistor interconnecting one end of each of said legs and means for connecting the other ends of said legs to said reference potential means, and said voltage feedback means further comprises a potentiometer, means for connecting said potentiometer between said signal output and said reference potential means, means for connecting said feedback input to said potentiometer and means for connecting said one end of one of said legs of said filter network to the wiper of said potentiometer.

7. A telephone line equalizer circuit for compensating for the attenuation characteristics of telephone lines of varying attenuations comprising input and output terminals for connecting said circuit in a telephone line, an operational amplifier means having a signal input, a feedback input and a signal output, first connecting means for connecting said signal input to said input terminal, second connecting means for connecting said signal output to output terminal, a voltage feedback means connecting said signal output to said feedback input, said voltage feedback means comprising a filter network having an electrical frequency characteristic substantially the same as the telephone line, and one of said connecting means comprises a further operational amplifier means having a signal input, a feedback input and a signal output, and a further voltage feedback means including a reference potential means, a further resistive means connected between the signal output of said further operational amplifier means and said reference potential means, means for connecting the feedback input of said further operational amplifier means to said further resistive means in such a way that the voltage developed across at least a fractional part of said further resistive means is fed to the feedback input of said further operational amplifier means as a feedback signal, a further filter network having an electrical frequency characteristic substantially the same as the telephone line, and controllable connection means for connecting said further filter network in parallel with a selectable portion of said further resistive means.

8. A telephone line equalizer circuit for compensating for the attenuation characteristics of telephone lines of varying attenuations comprising: input and output terminals for connecting said circuit in a telephone line; an operational amplifier means having a signal input, a feedback input and a signal output; first connecting means for connecting said signal input to said input terminal; second connecting means for connecting said signal output to output terminal; and a voltage feedback means connecting said signal output to said feedback input, said voltage feedback means comprising a filter network having an electrical frequency characteristic substantially the same as the telephone line; and one of said connecting means is a spot frequency amplifier comprising an emitter-follower amplifier means including potentiometer means in the emitter circuit thereof, and a series circuit including an inductor and a capacitor connected to said potentiometer means and the slider thereof in such a way that said series circuit is in parallel with selectable portions of said potentiometer means, and a further operational amplifier means having a signal input, a feedback input and a signal output, a reference potential means, a further potentiometer means connected between the signal output of said further operational amplifier means and said reference potential means, a further capacitor connected in parallel with at least a portion of said further potentiometer means, means for connecting the slider of said further potentiometer means to the feedback input of said further operational amplifier means, and means for connecting the output of said further operational amplifier means to the input of said emitter-follower amplifier means, the input of said further operational amplifier means being the input of said spot frequency amplifier.

9. A telephone line equalizer circuit for compensating for the attenuation characteristics of telephone lines of varying attenuations comprising input and output terminals for connecting said circuit in a telephone line, an operational amplifier means having a signal input, a feedback input and a signal output, first connecting means for connecting said signal input to said input terminal, second connecting means for connecting said signal output to output terminal, and a voltage feedback means connecting said signal output to said feedback input, said voltage feedback means comprising a filter network having an electrical frequency characteristic substantially the same as the telephone line, said filter network comprising a reference potential means, a pi-section including first and second legs each having a resistor and capacitor in series and a further capacitor in parallel therewith, an inductor and a further resistor interconnecting one end of each of said legs, and means for connecting the other ends of said legs to said reference potential means.

* * * * *